United States Patent
Li et al.

(10) Patent No.: US 11,843,525 B2
(45) Date of Patent: Dec. 12, 2023

(54) SYSTEM AND METHOD FOR AUTOMATICALLY SCALING VIRTUAL MACHINE VERTICALLY USING A FORECAST SYSTEM WITHIN THE COMPUTING ENVIRONMENT

(71) Applicant: VMware, Inc., Palo Alto, CA (US)

(72) Inventors: Wei Li, Milpitas, CA (US); Yu Sun, San Jose, CA (US); Sandy Lau, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 1031 days.

(21) Appl. No.: 16/688,456

(22) Filed: Nov. 19, 2019

(65) Prior Publication Data

US 2021/0149785 A1     May 20, 2021

(51) Int. Cl.
*H04L 41/5054*     (2022.01)
*G06F 9/50*        (2006.01)
*G06F 11/30*       (2006.01)

(52) U.S. Cl.
CPC .......... *H04L 41/5054* (2013.01); *G06F 9/505* (2013.01); *G06F 9/5044* (2013.01); *G06F 11/301* (2013.01)

(58) Field of Classification Search
CPC ...... G06F 9/5044; G06F 9/505; G06F 11/301; H04L 41/5054

USPC ................................ 709/220, 224, 226, 228
See application file for complete search history.

(56) References Cited

U.S. PATENT DOCUMENTS

| | | | |
|---|---|---|---|
| 8,756,609 B2 * | 6/2014 | Dasgupta | G06F 9/5072 718/104 |
| 8,756,610 B2 * | 6/2014 | Dasgupta | G06F 9/5072 718/104 |
| 2015/0134382 A1 * | 5/2015 | Holm-Petersen | G06Q 10/0631 705/7.12 |
| 2018/0284758 A1 * | 10/2018 | Cella | G05B 23/0283 |
| 2018/0287898 A1 * | 10/2018 | Bellini, III | H04L 41/5009 |
| 2018/0287956 A1 * | 10/2018 | Bryc | H04L 67/60 |
| 2019/0121348 A1 * | 4/2019 | Cella | G06N 3/084 |
| 2019/0171187 A1 * | 6/2019 | Cella | G05B 19/4183 |
| 2019/0324444 A1 * | 10/2019 | Cella | G05B 19/4183 |
| 2020/0142757 A1 * | 5/2020 | Norris | G06F 9/542 |
| 2020/0142802 A1 * | 5/2020 | Norris | G06F 9/505 |
| 2020/0275655 A1 * | 9/2020 | Iwasa | C07D 401/12 |
| 2020/0348662 A1 * | 11/2020 | Cella | G05B 23/0286 |
| 2021/0149785 A1 * | 5/2021 | Li | G06F 9/5044 |
| 2022/0108262 A1 * | 4/2022 | Cella | G06Q 10/063118 |

\* cited by examiner

*Primary Examiner* — Khanh Q Dinh (57) ABSTRACT

A feature capacity scaling methodology is disclosed. In a computer-implemented method, components of a computing environment are automatically monitored, and have a feature capacity analysis using a forecast performed thereon. Provided the feature capacity analysis determines that features of the components are well utilized, a vertical scaling of the features is performed.

18 Claims, 7 Drawing Sheets

SYSTEM AND METHOD FOR AUTOMATICALLY SCALING VIRTUAL MACHINE VERTICALLY USING A FORECAST SYSTEM WITHIN THE COMPUTING ENVIRONMENT

BACKGROUND ART

Implementing computing systems that manage large quantities of data and/or service large numbers of uses often presents problems of scale. For example, as demand for various types of computing services from, servicing that demand may become difficult without increasing the available computing resources accordingly. To facilitate scaling of computing resources in order to meet demand, a particular computing service may be implemented as a distributed application that executes on a number of computing hardware devices (e.g., server systems) or virtualized computing instances (e.g., virtual server systems). For example, a number of different software processes executing on different computing systems may operate cooperatively to implement the computing service. When more service capacity is needed, additional hardware and/or software resources may be deployed.

Managing provisioning of computing instances or computing hardware in computing service environments can be highly complex, due to the ever changing dynamics of application behavior in computing service environments. In particular, and by way of example, manually starting and stopping computing instances and any related virtual machines may be time consuming, inefficient and may be inadequate in responding to network conditions.

In various conventional computing environments, elasticity is one of the key reasons of using cloud infrastructure-as-a-Service (LaaS) provisions for workloads. It is defined as the degree to which cloud service is able to accommodate the varying demands at runtime by dynamically provisioning and releasing resources such that available resources matches the current demand closely. This ability to dynamically scale up and scale down is response to workload changes are accomplished using auto-scaling.

There are two types of auto-scaling: horizontal and vertical. Horizontal scaling allows virtual machines (VMs) to be acquired and released on demand. Vertical scaling allows adjusting comp VMs to cope with runtime changes. While horizontal scaling is widely adopted by cloud providers (e.g., Amazon Web Services, Microsoft Azure, Google Cloud), it usually involves administrator specifying thresholds on resource usage to trigger mitigation actions.

The Administrator needs to manually find optimal values for various parameters (e.g., minimum and maximum number of instances, action when threshold is breached). Horizontal scaling is also based on VMs with fixed characteristics. This coarse-grained resource allocation can lead to inefficient resource utilization as demand cannot always exactly fit the size of the VM. For pay-as-you-go model, this leads to user overpaying for allocated resources when utilization is low.

Vertical scaling on the other hand, allows fine grained control of computing resources such as CPU or memory. This is particularly beneficial for applications such as web service with fluctuating workload. Vertical scaling can scale down the size of the VM when an application is inactive and hence reduce cost. Conversely, it can also dynamically scale up to account for peak workloads. It allows the administrator to start smaller and easily expand to avoid waste caused by over-provisioning from the outset. Cloud providers, such as Microsoft Azure support vertical scaling based on user defined alert with VM reboot to finalize any changes.

In another conventional approach, when replacing a group of computing resources in the virtual computing environment with a different type of computing resource, the entire group may be replaced. To maintain continuity of processes or services executing on the computing resource, the computing resources must be gradually replaced over time with new resources type. The amount of time for replacement and the number of computing resources being replaced at any given time during the conversion may vary based on specific circumstances. In a smaller group of resources, the number of computing resources being replaced at a given time may generally be smaller than when the group of computing resources is larger and there are more computing resources may allow for efficient replacement in a timely manner without significant degradation in performance.

Thus, conventional approaches for providing computer scaling technologies are sometimes inefficient and insufficient because of the nature of changing demands. Consequently, conventional scaling technologies may improperly provision computing resources to accommodate perceived demand, and may negatively impact the quality of service or even interrupt the computing service. Thereby, service providers may be forced to choosing between expensive over-provisioning of computing resources or less-expensive but insufficient or inefficient computing resource for a particular demand.

Furthermore, as stated above, most conventional computing scaling environments, including machine learning environments are static without any predictive mechanism to allow administrating to automatically predict resource usage. That is, various machines or components are constantly being added to, or removed from, the computing environment. As such changes are made to the computing environment in either an overwhelming or underwhelming manner.

BRIEF DESCRIPTION OF THE DRAWINGS

The accompanying drawings, which are incorporated in and form a part of this specification, illustrate embodiments of the present technology and, together with the description, serve to explain the principles of the present technology.

The drawings referred to in this description should not be understood as being drawn to scale except if specifically noted.

DETAILED DESCRIPTION OF EMBODIMENTS

Reference will now be made in detail to various embodiments of the present technology, examples of which are illustrated in the accompanying drawings. While the present technology will be described in conjunction with these embodiments, it will be understood that they are not intended to limit the present technology to these embodiments. On the contrary, the present technology is intended to cover alternatives, modifications and equivalents, which may be included within the spirit and scope of the present technology as defined by the appended claims. Furthermore, in the following description of the present technology, numerous specific details are set forth in order to provide a thorough understanding of the present technology. In other instances, well-known methods, procedures, components, and circuits have not been described in detail as not to unnecessarily obscure aspects of the present technology.

Notation And Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "displaying", "identifying", "generating", "deriving", "providing," "utilizing", "determining," or the like, refer to the actions and processes of an electronic computing device or system such as: a host processor, a processor, a memory, a virtual storage area network (VSAN), a virtualization management server or a virtual machine (VM), among others, of a virtualization infrastructure or a computer system of a distributed computing system, or the like, or a combination thereof. The electronic device manipulates and transforms data, represented as physical (electronic and/or magnetic) quantities within the electronic device's registers and memories, into other data similarly represented as physical quantities within the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the Figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some embodiments, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Example Computer System Environment

Figure 1:
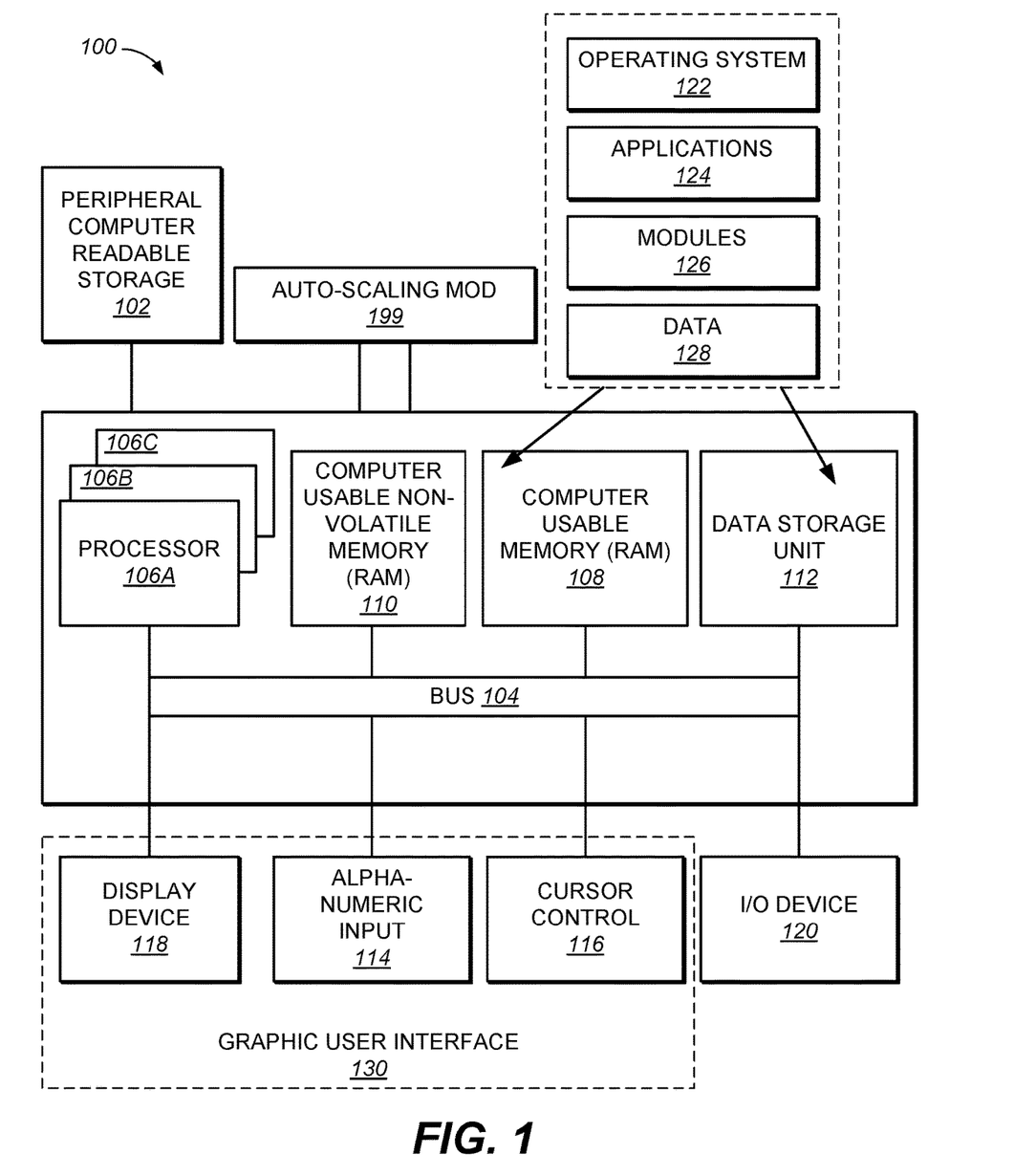
FIG. 1 shows an example computer system upon which embodiments of the present invention can be implemented, in accordance with an embodiment of the present invention.

With reference now to FIG. 1, all or portions of some embodiments described herein are composed of computer-readable and computer-executable instructions that reside, for example, in computer-usable/computer-readable storage media of a computer system. That is, FIG. 1 illustrates one example of a type of computer (computer system 100) that can be used in accordance with or to implement various embodiments which are discussed herein. It is appreciated that computer system 100 of FIG. 1 is only an example and that embodiments as described herein can operate on or within a number of different computer systems including, but not limited to, general purpose networked computer systems, embedded computer systems, routers, switches, server devices, client devices, various intermediate devices/nodes, stand alone computer systems, media centers, handheld computer systems, multi-media devices, virtual machines, virtualization management servers, and the like. Computer system 100 of FIG. 1 is well adapted to having peripheral tangible computer-readable storage media 102 such as, for example, an electronic flash memory data storage device, a floppy disc, a compact disc, digital versatile disc, other disc based storage, universal serial bus "thumb" drive, removable memory card, and the like coupled thereto. The tangible computer-readable storage media is non-transitory in nature.

System 100 of FIG. 1 includes an address/data bus 104 for communicating information, and a processor 106A coupled with bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors. System 100 also includes data storage features such as a computer usable volatile memory 108, e.g., random access memory (RAM), coupled with bus 104 for storing information and instructions for processors 106A, 106B, and 106C. System 100 also includes computer usable non-volatile memory 110, e.g., read only memory (ROM), coupled with bus 104 for storing static information and instructions for processors 106A, 106B, and 106C. Also present in system 100 is a data storage unit 112 (e.g., a magnetic or optical disc and disc drive) coupled with bus 104 for storing information and instructions. System 100 also includes an alphanumeric input device 114 including alphanumeric and function keys coupled with bus 104 for communicating information and command selections to processor 106A or processors 106A, 106B, and 106C. System 100 also includes a cursor control device 116 coupled with bus 104 for communicating user input information and command selections to processor 106A or processors 106A, 106B, and 106C. In one embodiment, system 100 also includes a display device 118 coupled with bus 104 for displaying information.

Referring still to FIG. 1, display device 118 of FIG. 1 may be a liquid crystal device (LCD), light emitting diode display (LED) device, cathode ray tube (CRT), plasma display device, a touch screen device, or other display device suitable for creating graphic images and alphanumeric characters recognizable to a user. Cursor control device 116 allows the computer user to dynamically signal the movement of a visible symbol (cursor) on a display screen of display device 118 and indicate user selections of selectable items displayed on display device 118. Many implementations of cursor control device 116 are known in the art including a trackball, mouse, touch pad, touch screen, joystick or special keys on alphanumeric input device 114 capable of signaling movement of a given direction or manner of displacement. Alternatively, it will be appreciated that a cursor can be directed and/or activated via input from alphanumeric input device 114 using special keys and key sequence commands. System 100 is also well suited to having a cursor directed by other means such as, for example, voice commands. In various embodiments, alphanumeric input device 114, cursor control device 116, and display device 118, or any combination thereof (e.g., user interface selection devices), may collectively operate to provide a graphical user interface (GUI) 130 under the direction of a processor (e.g., processor 106A or processors 106A, 106B, and 106C). GUI 130 allows user to interact with system 100 through graphical representations presented on display device 118 by interacting with alpha-numeric input device 114 and/or cursor control device 116.

System 100 also includes an I/O device 120 for coupling system 100 with external entities. For example, in one embodiment, I/O device 120 is a modem for enabling wired or wireless communications between system 100 and an external network such as, but not limited to, the Internet.

Referring still to FIG. 1, various other components are depicted for system 100. Specifically, when present, an operating system 122, applications 124, modules 126, and data 128 are shown as typically residing in one or some combination of computer usable volatile memory 108 (e.g., RAM), computer usable non-volatile memory 110 (e.g., ROM), and data storage unit 112. In some embodiments, all or portions of various embodiments described herein are stored, for example, as an application 124 and/or module 126 in memory locations within RAM 108, computer-readable storage media within data storage unit 112, peripheral computer-readable storage media 102, and/or other tangible computer-readable storage media.

Brief Overview

First, a brief overview of an embodiment of the present automatic vertical scaling 199 invention, is provided below. Various embodiments of the present invention provide a method and system for automated component feature capacity monitoring and adjustment within a virtual machine computing environment utilizing historical capacity utilization of resources over a predefined period of time to forecast future utilization of the resource.

More specifically, the various embodiments of the present invention provide a novel approach for automatically providing a vertical scaling virtual central processing units (vCPU) to handle resource capacity usage in various machines or components of a computing environment such as, for example, machine learning environment. In one embodiment, an IT administrator (or other entity such as, but not limited to, a user/company/organization etc.) registers multiple number of machines or components, such as, for example, virtual machines from VMware, Inc. of Palo Alto.

In the present embodiment, the IT administrator is not required to label all of the virtual machines with the corresponding service type or indicate the importance of the particular machine or component. Further, the IT administrator is not required to manually selectively list only those machines or components which the IT administrator feels warrant updating with components in the system platform. Instead, and as will be described below in detail, in various embodiments, the present invention, will automatically determine which machines or component warrant a decrease or increase in the proper allocation of resources in the computing environment.

As will also be described below, in various embodiments, the present invention is a computing module which integrated within a virtual machine, for example virtual machines from VMware, Inc. of Palo Alto. In various embodiments, the present automatic scaling invention, determines the service type and corresponding importance of various machines or components after observing the capacity consumption by each of the machines or components for a period of time as measured against predefined usage thresholds configured by an administrator or derived through machine learning algorithms.

Additionally, for purposes of brevity and clarity, the present application will refer to "machines or components" of a computing environment. It should be noted that for purposes of the present application, the terms "machines or components" is intended to encompass physical (e.g., hardware and software based) computing machines, physical components (such as, for example, physical modules or portions of physical computing machines) which comprise such physical computing machines, aggregations or combination of various physical computing machines, aggregations or combinations or various physical components and the like.

Further, it should be noted that for purposes of the present application, the terms "machines or components" is also intended to encompass virtualized (e.g., virtual and software based) computing machines, virtual components (such as, for example, virtual modules or portions of virtual computing machines) which comprise such virtual computing machines, aggregations or combination of various virtual computing machines, aggregations or combinations or various virtual components and the like.

Additionally, for purposes of brevity and clarity, the present application will refer to machines or components of a computing environment. It should be noted that for purposes of the present application, the term "computing environment" is intended to encompass any computing environment (e.g., a plurality of coupled computing machines or components including, but not limited to, a networked plurality of computing devices, a neural network, a machine learning environment, and the like). Further, in the present application, the computing environment may be comprised of only physical computing machines, only virtualized computing machines, or, more likely, some combination of physical and virtualized computing machines.

Furthermore, again for purposes and brevity and clarity, the following description of the various embodiments of the present invention, will be described as integrated within a forecasting system. Importantly, although the description and examples herein refer to embodiments of the present invention integrated within a forecasting system with, for example, its corresponding set of functions, it should be understood that the embodiments of the present invention are well suited to not being integrated into a forecasting system and operating separately from a forecasting system. Specifically, embodiments of the present invention can be integrated into a system other than a forecasting system. Embodiments of the present invention can operate as a stand-alone module without requiring integration into another system. In such an embodiment, results from the present invention regarding feature selection and/or the importance of various machines or components of a computing environment can then be provided as desired to a separate system or to an end user such as, for example, an IT administrator.

Importantly, the embodiments of the present auto-scaling invention significantly extend what was previously possible with respect to providing a vertical scaling application for machines or components of a computing environment to enable the spontaneous allocation of resources to components in the virtualized computing environment. Various embodiments of the present auto-scaling forecast invention enable the improved capabilities while reducing reliance upon, for example, an IT administrator, to selectively register various machines or components of a computing environment for forecasting protection and monitoring. This is in contrast to conventional approaches for providing resource allocation to various machines or components of a computing environment which highly dependent upon a horizontal approach relying on the skill and knowledge of a system administrator. Thus, embodiments of present auto-scaling resource allocation invention provide a methodology which extends well beyond what was previously known.

Hence, the embodiments of the present auto-scaling resource allocation invention greatly extend beyond conventional methods for providing forecasting to machines or components of a computing environment. Moreover, embodiments of the present invention amount to significantly more than merely using a computer to provide conventional forecasting measures to machines or components of a computing environment. Instead, embodiments of the present invention specifically recite a novel process, necessarily rooted in computer technology, for vertically allocating resources in a virtualized computing environment.

Furthermore, in various embodiments of the present invention, and as will be described in detail below, an automatic vertical scaling component, such as, but not limited to, virtual machines from VMware, Inc. of Palo Alto, California will include novel resource allocation solution for a computing environment (including, but not limited to a data center comprising a virtual environment). In embodiments of the present invention, unlike conventional forecasting systems which "chases the threats", the present forecasting system will instead focus on monitoring the intended states of applications, machines or components of the computing environment, and the present forecasting system will raise alarms if any anomaly behavior is detected.

Additionally, as will be described in detail below, embodiments of the present invention provide a forecasting system including a novel allocation feature for machines or components (including, but not limited to, virtual machines) of the computing environment. The novel resource allocation feature of the present system enables ends users to readily assign the proper use and scopes of services of the machines or components as the demand for resources change in the computing environment, Moreover, the novel forecasting feature of the present resource allocation system enables end users to identify various machines or components (including, but not limited to, virtual machines) similar to given and/or previously identified machines or components (including, but not limited to, virtual machines) when such machines or component satisfy a particular given criteria and spontaneously allocate them as the resource needs change in the computing environment. Hence, as will be described in detail below, in embodiments of the present resource forecast system, the novel forecasting feature functions by finding or identifying the "siblings" of various other machines or components (including, but not limited to, virtual machines) within the computing environment.

Continued Detailed Description of Embodiments after Brief Overview

As stated above, feature selection which is also known as "variable selection", "attribute selection" and the like, is an import process of machine learning. The process of feature selection helps to determine which features are most relevant or important to use to create a machine learning model (predictive model).

Figure 2:
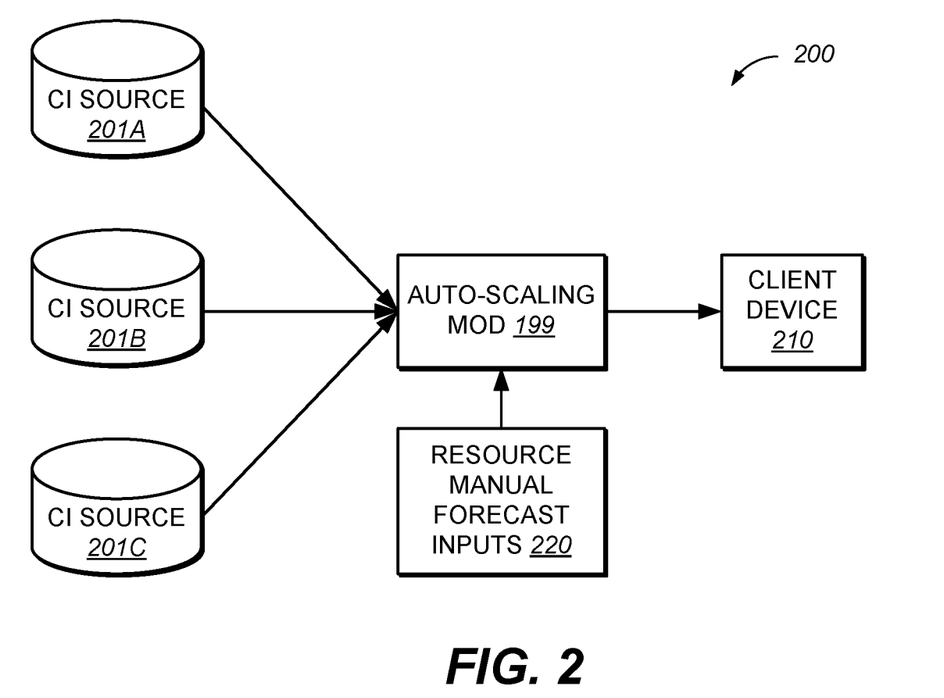
FIG. 2 is a schematic overview of vertical computing resource scaling environment, in accordance with an embodiment of the present invention.

With reference now to FIG. 2, in embodiments of the present invention, the auto-scaling environment, within a large scale virtual computing environment is determined as follows. The virtual computing environment comprises a plurality of configuration items (CIs) given.

More specifically, the various embodiments of the present invention provide a novel approach for automatically providing a classification for the various machines or components of a computing environment such as, for example, machine learning environment. Further, unlike conventional approaches, in embodiments of the present auto-scaling invention, the IT administrator is not required to label all of the virtual machines with the corresponding service type or indicate the importance of the particular machine or component solely based on the retained or legacy knowledge of the administrator. Further, the IT administrator is not required to selectively list only those machines or components which the IT administrator feels warrant capacity upgrades in the environment. Instead, the present invention, provides a dynamic monitoring of resource usage capacity in the computing environment and forecast capacity usage to dynamically adjust the resources without the need of off-lining such resource from the computing environment as explicitly described above in conjunction with the discussion of FIGS. 1 and 2.

Figure 3:
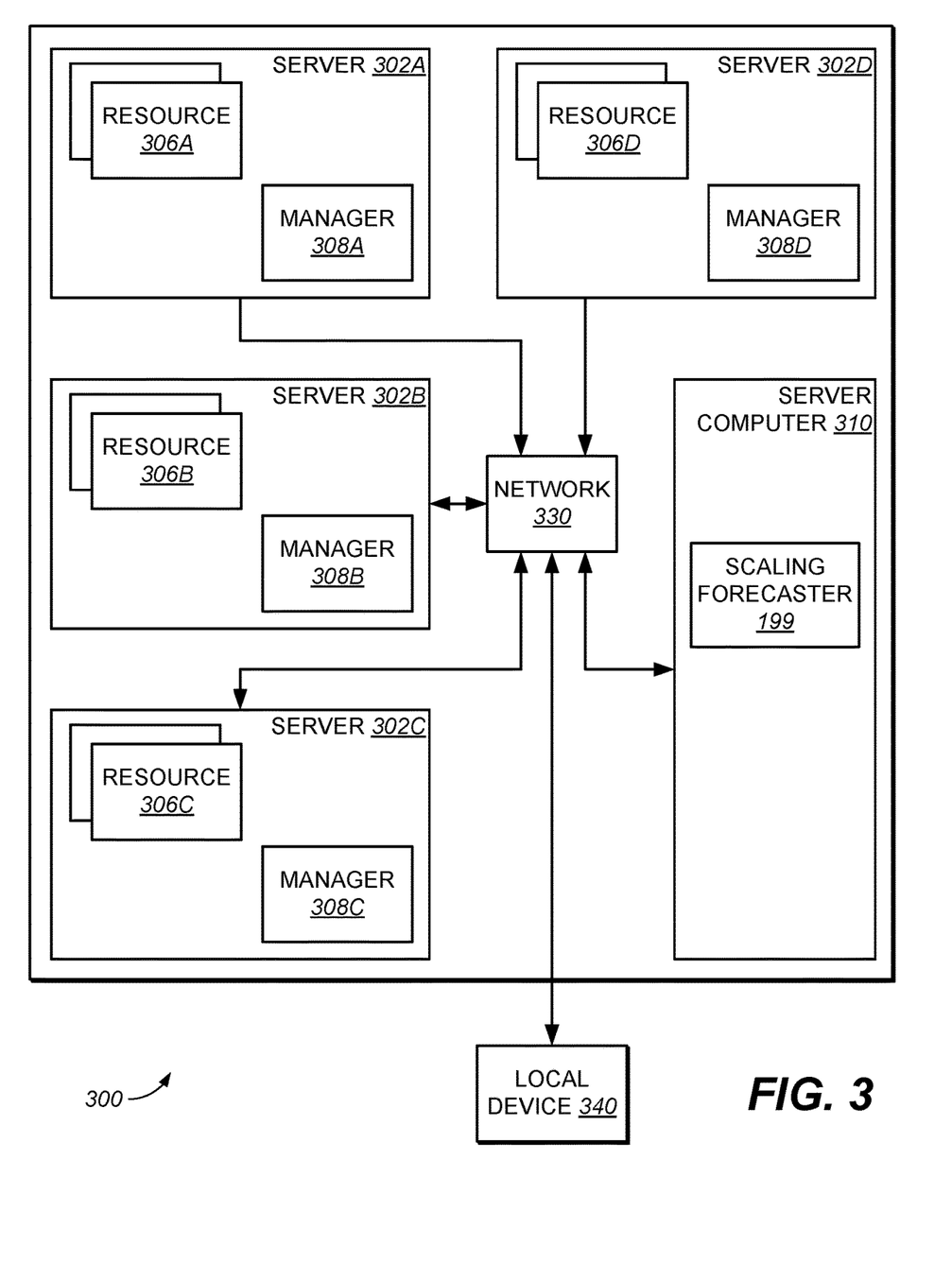
FIG. 3 is a schematic overview of a virtual computing resource environment, in accordance with an embodiment of the present invention.

With Reference now to FIG. 3, is an embodiment of how components in a data center may function as a computing service 300 in a service provider environment in accordance with one embodiment of the present invention. The computing service 300 (i.e., the cloud provider or service provider) may be capable of delivering computing and storage service to a community of end users. In one embodiment, the computing service 300 may be established for an organization by or on behalf of the organization. That is, the computing service 300 may offer a "private cloud environment." In another embodiment, the computing service 300 may support a multi-client environment where a plurality of clients operate independently (i.e., a public cloud environment). Generally speaking, the computing service 300 can provide the following models structure as a Service ("IaaS"), Platform as a Service ("PaaS"), and/or Software as a Service ("SaaS"). Other models may also be provided.

The particularly illustrated computing service 300 may include a plurality of server computers 302A-302D). The server 302A-302D provide computing resources for executing software 306A-306D. In one embodiment, the resources may be virtual machines. A virtual machine may be implemented in a software implementation of a machine (e.g., computer) that executes applications like a physical machine. In the example of virtual machine, each of the servers 302A-302D may be configured to execute a resource manager 308 capable of executing the resources. The resource manager 308 may be a hypervisor or another type of program configured to enable the execution of multiple resources 306A-306D on a single server.

In one embodiment, an auto scaling forecasting component 199 is included to vertically scale the resources 306A-306D based on the teachings of the present invention. In one embodiment, the auto scaling forecasting component 199 allows a user to specify scale up policies for use in determining when new resources should be instantiated or when existing resources use must be terminated. The auto scaling forecasting component 199 may include a number of sub-components executing on different server computers 302 or other computing devices.

Still referring to FIG. 3, a network 330 may be utilized to interconnect the server computers 302A-302D and the other resource components 306A-306D in the computing environment. In one embodiment, the network 330 may be a local network (LAN) and may be connected to a wide Area Network (WAN) so that end users may access the computing service 300.

Once again, although various embodiments of the present automatic vertical scaling invention described herein refer to embodiments of the present invention integrated within a forecasting system with, for example, its corresponding set of functions, it should be understood that the embodiments of the present invention are well suited to not being integrated into a forecasting system and operating separately from a forecasting system. Specifically, embodiments of the present invention can be integrated into a system other than a forecasting system. Embodiments of the present invention can operate as a stand-alone module without requiring integration into another system. In such an embodiment, results from the present invention regarding feature selection and/or the importance of various machines or components of a computing environment can then be provided as desired to a separate system or to an end user such as, for example, an IT administrator.

Figure 4:
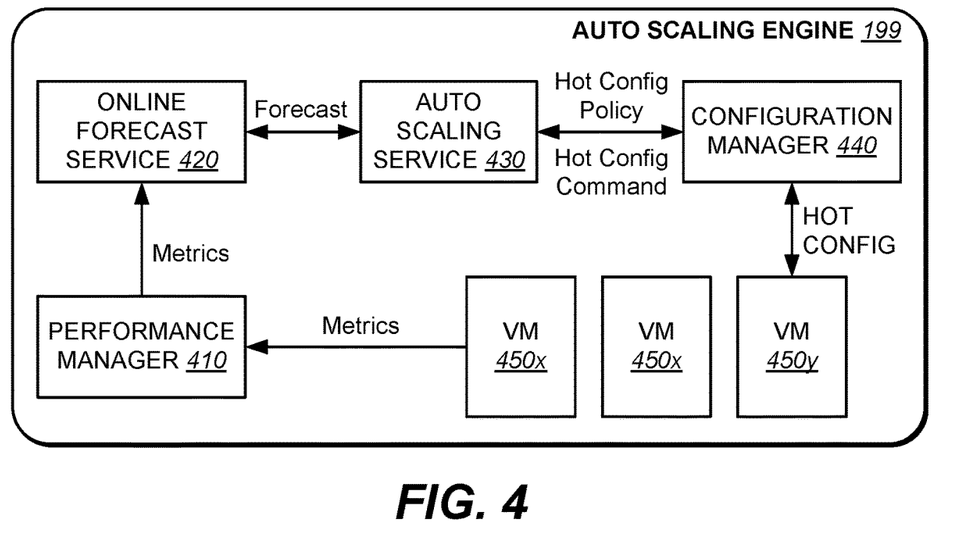
FIG. 4 is a schematic representation of a auto scaling components, in accordance with an embodiment of the present invention.

With reference next to FIG. 4, a schematic diagram 400 of a auto scaling component 199 of an embodiment of the present invention is shown. In one embodiment of the present invention, auto scaling component 199 is implemented in a virtual machine (VM) computing environment. As shown in FIG. 4, the auto scaling component 199 comprises performance manager 410, forecast service component 420, auto scaling service component 430, configuration manager 440 and a plurality virtual machines 450$x$-450$y$.

In one implementation of the auto scaling forecasting component 199 is utilized in a vSphere virtual computing devices provided by VMware of Palo Alto, California. The vSphere computing devices enable hot plugs of resources by system administrators to add additional virtual hardware to running virtual machines. This capability enables the possibility to auto scale these VMs vertically. By integrating the auto scaling component 199, the virtual computing environment is capable of predicting future resource demand by the VM. In one embodiment, if forecast service 420 indicates the VM may be under stress in the future, the system can proactively and automatically hot plug additional VM resources to prevent VM's service degradation, so application can run smoothly in the vSphere environment.

In one embodiment, the Configuration manager component 440 takes inputs from a user to generates auto scale policy. The configuration manager component 440 interacts with the auto scale service component 430 to determine whether a specified VM can support hot plug. The configuration manager component 440 is also responsible for executing the auto scale commands issued by the auto scaling component service 430. In one embodiment the configuration component 440 includes a basic configuration component and a advance configuration component to allow a user to set capacity thresholds for a given instance of resource use in the computing environment.

Still referring to FIG. 4, the auto scale service component 430 manages the VM auto vertical scaling in the computing environment. The auto scaling service component 430 has the following capabilities: Firstly, it determines whether a specified VM can support hot plug. In determining such capability, the auto scaling service component 430 utilizes several factors such as whether a particular VMware Tool version, ESX version, VM operating system, etc., is being used. Second, the auto scaling service component 430 retrieves auto scale policy from configuration manager 440, configures online forecast service component 420 to start monitoring performance metrics for the specified VMs. Third, the auto scaling service component periodically pulls forecast service APIs to get the VM forecast. And fourth, the auto scaling service component 430 analyses forecast result and issues resize commands to configuration manager 440.

In analyzing the forecast result, in the first instance, the auto scale service component 430 determines if the forecast result is larger than the configured value of the resource capacity. And if the forecast value is smaller than the configured maximum value, then the auto scale service component issues a command to the configuration manager 440 to hot increase VM configuration. If on the other hand, the forecast value exceeds the configured maximum value, then the auto scale service component issues a warning.

In the second instance, if the forecast value is smaller than the current configured value and this continues through the next few pulling periods (i.e., determined by the decrement confirmation window), the auto scale service component 430 issues a command to the configuration manager 440 to hot decrease VM configuration.

Figure 5A:
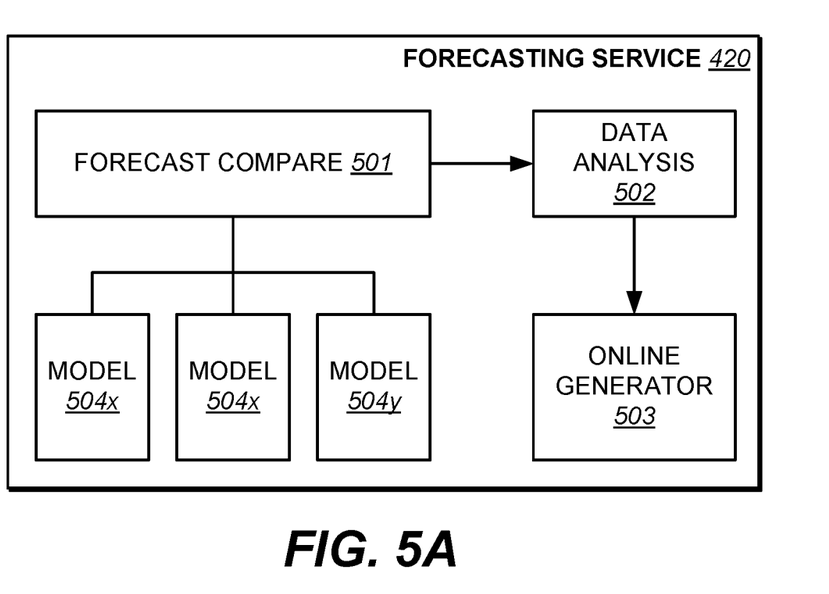
FIG. 5A is a schematic representation of an exemplary vertical scaling forecasting service component, in accordance with an embodiment of the present invention.

Still referring to FIG. 4, the forecast service component 420 receives performance metrics from the performance manager 410 as they are generated. Using historical data coupled with statistical model analysis and machine learning algorithms, it can predict with reasonable accuracy for the metric trend and periodicity for the capacity utilization of resources being monitored. The forecast service component 420 utilizes the forecast engine component to provide time series data analysis capabilities dynamically. Data model in the forecast service component 420 are continually updated when new metric data streams in. Data streams will be processed by a set of models 504x-504y show in FIG. 5A that are responsible for detecting trend, stochastic auto regressive moving average (ARMA) and seasonal periodic respectively. When forecast is requested, the engine 501 in FIG. 5A combines outcomes from these models 504x-504y as shown in FIG. 5A, and the forecast result is generated instantaneously.

Figure 5B:
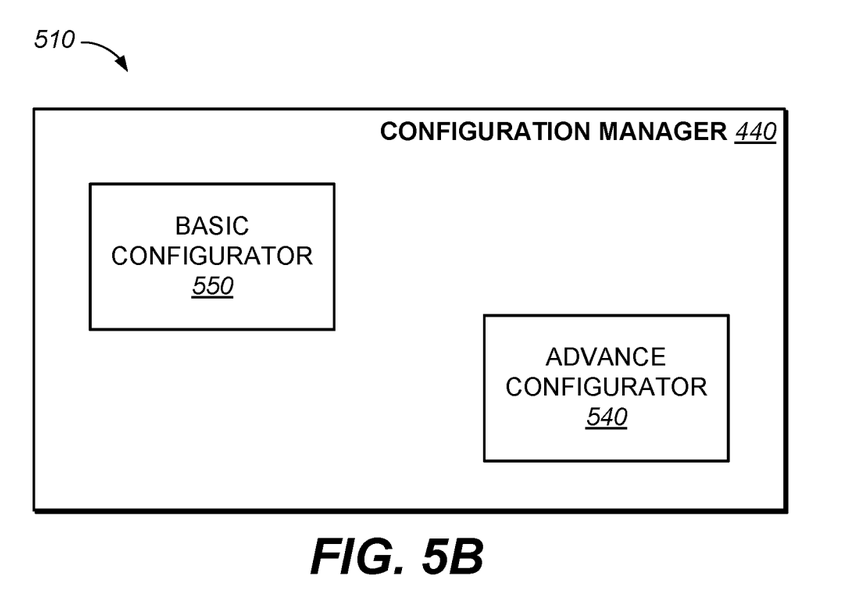
FIG. 5B is a schematic representation of an exemplary vertical scaling configuration component, in accordance with an embodiment of the present invention

Referring now to FIG. 5B, a schematic diagram 510 of one embodiment of the configuration manager 440 in accordance with one embodiment of the present invention is shown. The configuration manager 440 shown in FIG. 5B comprises a basic configuration component 550 and a advance configuration component 540.

In one embodiment, the basic configuration component 550 simplifies user configuration of resource capacity utilization in the computing environment. At a minimum, a user just needs to specify a set of VMs that needs auto scaling. This can be a set of hand-picked VMs, or can be all VMs under a container, e.g., host, cluster being monitored by the user.

The advance configuration component 540 enables a user to optionally specify auto scaling policy for a resource being monitored. In one embodiment, the user can set the maximum allowed threshold value that triggers resource configuration. By default, that value can be a percentage of the configured capacity, bounded by the underlaying physical provider capacity with some buffer.

Generally, a user may not want to automatically increase resource capacity indefinitely. This is because this may lead to an increase sometimes, in ever increasing resource consumption which may be caused by a resource leak. Auto increment will not exceed maximum allowed value even if forecast indicates future demand will exceed configured maximum value. In such cases, the system will send out alert notification instead. A forecast window provides the means to determine how far into the future for the online forecast service 420 can detect potential stress in the computing environment. The advance configuration component 540 further includes a decrement confirmation window component in which decrementing VM resource capacity is configured. To be on the conservative side, decrements in the VM configuration are not implemented as soon as the forecast service component 420 indicates a downward trend in this instance. Decrements will be triggered only if such a downward trend is reported continuously in the duration as specified by the confirmation window. In one embodiment, such a decrement is triggered, for example, if the confirmation window is 2, the system waits for 2 consecutive decrements in forecast before decreasing the resource configuration.

Figure 6:
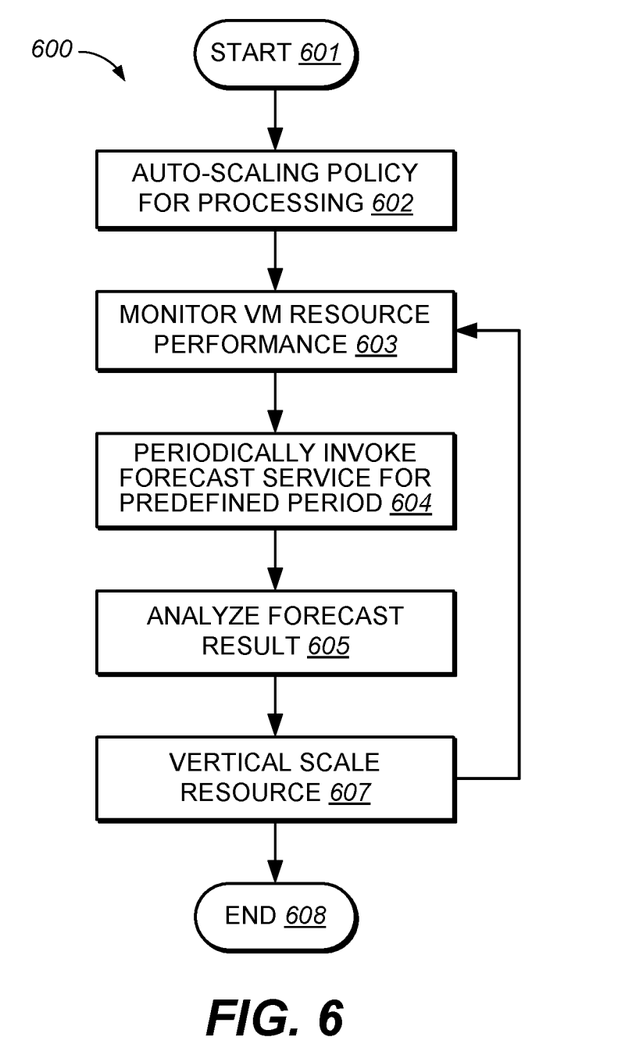
FIG. 6 is a flow diagram for a method of vertically scaling computer resources within a computing environment utilizing the novel forecasting, in accordance with an embodiment of the present

Reference is next made to FIG. 6 is a schematic depiction of a workflow according to one embodiment of the present invention. As shown in FIG. 6, at 602 a user specifies VMs that need auto scale protection. For advanced user, this may be optionally specified using the auto scale policy.

At 603, the online forecast service monitors the VM CPU/Memory performance metric as they are generated, updating forecasting model continuously. At 604, the auto scale service periodically invokes forecast service API to request forecast for a predefined future period e.g., get forecast for next 24 hours.

At 605, the auto scale service analyses forecast result, if forecast indicates VM demand will exceed its configured capacity in the near future, hot increases VM configuration (607). Or it could be opposite if forecast indicates VM demand will decrease in the future, it could decrease VM configuration (607). This is a continuous iterative process (607→603).

Figure 7:
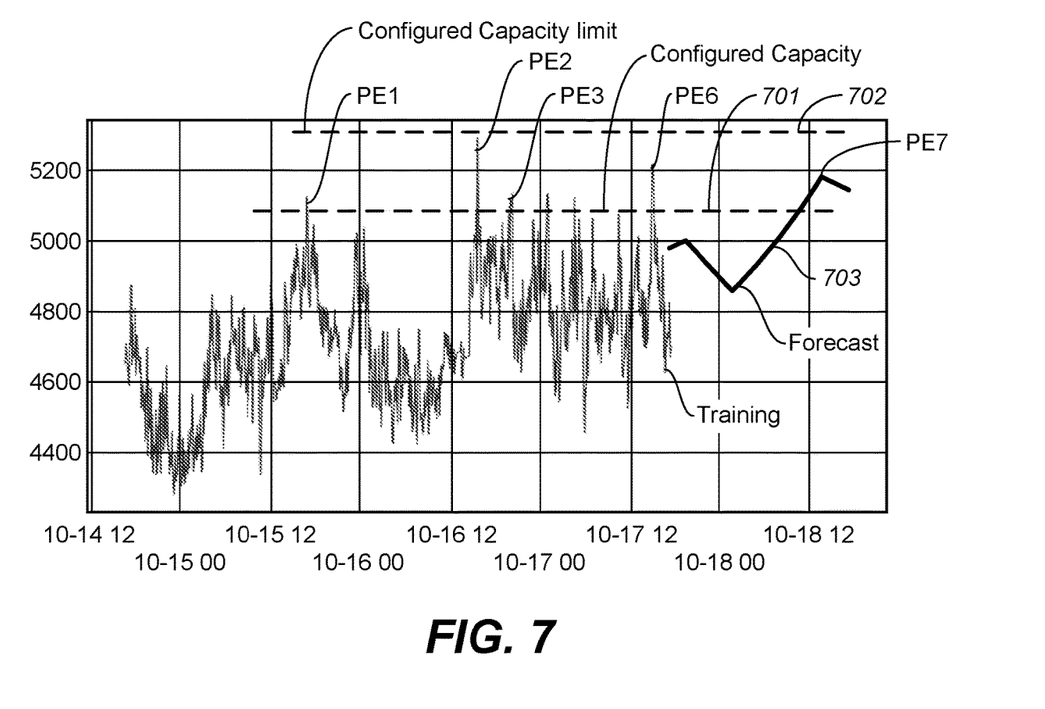
FIG. 7 is a diagram of an exemplary graphical representation of a virtual machine central processing unit demand and forecast, in accordance with an embodiment of the present invention.

Reference is next made to FIG. 7 which illustrates a graphical representation of a result of a VM implementing the vertical scaling method of one embodiment of the present invention. FIG. 7 depicts a virtual machine's CPU demand that is monitored by the auto-scaling component 199 of the present invention. The blue line depicted in FIG. 7 represents actual CPU demand, for example, during a 72 hour period of monitoring. The Red line represents forecasted CPU demand in the next 24 hours. As shown in FIG. 7, the blue line does cross the configured capacity 701 a few times in the past (i.e., Pt 1-Pt6). But the forecast service didn't detect a breach of configured capacity 701 in the near future when these breaches occurred. This forecasted usage therefore allows the administrator to hold the need to change the configuration of the CPU capacity because the administrator will not want to increase CPU capacity as a result of a few isolated jitters in CPU demand. From the forecasted trend of utilization, the administrator will only need to adjust the CPU configuration at Pt 7 because the forecasted red line 703 indicates a breach of configured capacity 701 in the near future and even though Pt7 is still lower than the configured capacity 701, the CPU hot plug will be triggered to allow the administrator to dynamically adjust the VM CPU capacity in order to avoid CPU stress in the VM in the near future.

Hence, embodiments of the present invention greatly extend beyond conventional methods for providing forecasting to machines or components of a computing environment. Moreover, embodiments of the present invention amount to significantly more than merely using a computer to provide conventional forecasting measures to machines or components of a computing environment. Instead, embodiments of the present invention specifically recite a novel process, necessarily rooted in computer technology, for providing forecasting to machines or components of a computing environment.

Furthermore, in various embodiments of the present invention, a forecasting system, such as, but not limited to, virtual computing devices from VMware, Inc. of Palo Alto, California will include a novel forecasting solution for a computing environment (including, but not limited to a data center comprising a virtual environment). In embodiments of the present invention, unlike conventional forecasting systems which "chases the threats", the present forecasting system focuses on monitoring the intended states of applications, machines or components of the computing environment, and the present forecasting system will raise alarms if any anomaly behavior is detected.

Additionally, embodiments of the present invention provide a forecasting system including a novel search feature for machines or components (including, but not limited to, virtual machines) of the computing environment. The novel search feature of the present forecasting system enables ends users to readily assign the proper and scopes and services the machines or components of the computing environment, Moreover, the novel search feature of the present forecasting system enables end users to identify various machines or components (including, but not limited to, virtual machines) similar to given and/or previously identified machines or components (including, but not limited to, virtual machines) when such machines or component satisfy a particular given criteria. Hence, in embodiments of the present forecasting system, the novel search feature functions by finding or identifying the "siblings" of various other machines or components (including, but not limited to, virtual machines) within the computing environment.

CONCLUSION

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the Claims.

Reference throughout this document to "one embodiment," "certain embodiments," "an embodiment," "various embodiments," "some embodiments," "various embodiments", or similar term, means that a particular feature, structure, or characteristic described in connection with that embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A computer-implemented method for automated analysis of features in a computing environment, said method comprising:
   automatically monitoring components of said computing environment;
   automatically performing a feature capacity utilization analysis of said components of said computing environment; and
   provided said feature selection analysis determines that features of said components of said computing environment meet a predefined threshold, performing a resource capacity adjustment while said resource is in operating mode in said computing environment, wherein said computer-implemented method for said automated analysis of said features in said computing environment further comprises:
   automatically providing a vertical scaling virtual central processing units (vCPU) to handle resource capacity usage of said components of said computing environment and
   wherein said computer-implemented method for said automated analysis of said features in said computing environment does not require an information technology (IT) administrator to manually register the presence or indicate the importance of virtual machines existing in said computing environment.

2. The computer-implemented method of claim 1 wherein said performing a feature capacity utilization analysis of said components of said computing environment further comprises:
   performing a vertical scaling of said resource components of said computing environment.

3. The computer-implemented method of claim 1 wherein said performing a feature capacity utilization analysis of said components of said computing environment further comprises:
   calculating a maximum capacity threshold value of said components of said computing environment.

4. The computer-implemented method of claim 1 wherein said performing a feature capacity utilization analysis of said components of said computing environment further comprises:
   calculating a minimum capacity threshold value of said components of said computing environment.

5. The computer-implemented method of claim 2 wherein said performing automatic vertical scaling of said features of said components of said computing environment based on predefined resource utilization thresholds of said components of said computing environment.

6. The computer-implemented method of claim 5 wherein said performing a vertical scaling of said features of said resources of said computing environment comprises:
   automatically configuring said resource while said resource is in operating mode in said computing environment.

7. The computer-implemented method of claim 6 wherein said performing a vertical scaling of said resource further comprises:
automatically monitoring performance metrics of said resource to forecast future capacity requirements of said resource of said computing environment.

8. The computer-implemented method of claim 6 wherein said performing a vertical scaling of a resource further comprises:
Setting a scaling policy for guiding capacity utilization analysis of said resource of said computing environment.

9. The computer-implemented method of claim 8 wherein said scaling policy set upper and lower utilization threshold limits for said resource in order to determine when capacity availability of said resource must be increased or decreased.

10. The computer-implemented method of claim 1 further comprising:
periodically repeating said automated analysis of said features in said computing environment to generate updated results of said automated analysis of said features of said components of said computing environment.

11. The computer-implemented method of claim 10 further comprising:
providing said updated results of said automated analysis of said features of said components of said computing environment to a forecasting system.

12. The computer-implemented method of claim 1 further comprising:
automatically providing said results for said automated analysis of said features of said components of said computing environment without requiring intervention by a system administrator.

13. A computer-implemented method for automated dynamic analysis of features in a computing environment, said method comprising:
automatically monitoring components of said computing environment;
automatically performing a feature capacity analysis of said components of said computing environment, said feature capacity analysis selected from the group comprising available resource capacity utilization; and
dynamically adjusting said resource capacity while said resource is in an operating mode in said computing environment;
and
providing results of said method for automated vertical scaling analysis of said features of said components of said computing environment, wherein said computer-implemented method for said automated dynamic analysis of said features in said computing environment further comprises:
automatically providing a vertical scaling virtual central processing units (vCPU) to handle resource capacity usage of said components of said computing environment; and
wherein said computer-implemented method for said automated dynamic analysis of said features in said computing environment does not require an information technology (IT) administrator to manually register the presence or indicate the importance of virtual machines existing in said computing environment.

14. The computer-implemented method of claim 13 wherein said performing a feature capacity analysis of said components of said computing environment further comprises:
performing a vertical scaling of said resources based on a forecast of resource utilization of said computing environment.

15. The computer-implemented method of claim 14 wherein said performing a vertical scaling of said resources comprises automatically configuring said resource while said resource is in operating mode in said computing environment.

16. The computer-implemented method of claim 13 wherein said automatically monitoring provides performance metrics of said resources to a forecast service to automatically continuously forecast resource requirements in said computing environment.

17. The computer-implemented method of claim 16 wherein said the vertical scaling component periodically invokes forecast requests from the forecast service component for a predefined period of time during the operation of the resource in the computing environment.

18. The computer-implemented method of claim 16 wherein said vertical scaling module, comprises a configuration manager component that take inputs from users to generate an auto scale policy to be applied by the vertical scaling component, wherein the configuration manager component consults with auto scaling service to determine whether a resource can support a dynamic resources update while the resource is in operating mode in said computing environment.

* * * * *